United States Patent
Velez et al.

(12) 
(10) Patent No.: US 6,289,057 B1
(45) Date of Patent: Sep. 11, 2001

(54) METHOD AND APPARATUS FOR ENERGY DETECTION IN A MODEM

(75) Inventors: Edgar Velez, Kanata; Peter Noel, Winchester; Sisay Yirga, Nepean, all of (CA)

(73) Assignee: Nortel Networks Limited, Montréal (CA)

( * ) Notice: Subject to any disclaimer, the term of this patent is extended or adjusted under 35 U.S.C. 154(b) by 0 days.

(21) Appl. No.: 09/069,741

(22) Filed: Apr. 30, 1998

(51) Int. Cl.[7] .................. H04B 1/38; H04L 27/22
(52) U.S. Cl. .................. 375/317; 375/222; 375/316; 375/329
(58) Field of Search .................. 375/222, 219, 375/317, 316, 345, 329, 377, 287, 318, 224, 227, 228, 340, 343, 143, 152; 329/304; 455/234.1, 226.2, 557; 379/399; 327/50

(56) References Cited

U.S. PATENT DOCUMENTS

| | | | |
|---|---|---|---|
| 4,494,240 | * 1/1985 | Payton | 375/316 |
| 5,388,127 | * 2/1995 | Scarpa | 375/376 |
| 5,446,771 | 8/1995 | Lin | 375/224 |
| 5,512,898 | * 4/1996 | Norsworthy et al. | 341/155 |
| 5,701,332 | 12/1997 | Decrouez | 375/334 |
| 5,701,601 | 12/1997 | Tomoe et al. | 455/226.2 |
| 5,926,502 | * 7/1999 | Schilling | 375/349 |

* cited by examiner

Primary Examiner—Stephen Chin
Assistant Examiner—Betsy L. Deppe
(74) Attorney, Agent, or Firm—Max R. Wood; Swabey Ogilvy Renault

(57) ABSTRACT

A system of energy detection for detecting a valid signal in a modem to enable power savings in receiver and transmitter circuits. The method of energy detection includes the steps of: (a) processing a prescribed number of signal samples (e.g. typically between 512 and 2048); (b) determining an average energy level for the prescribed number of signal samples; (c) determining a gain of an amplifier based on the processed signal samples; (d) comparing the average energy level with a prescribed energy level threshold; and (e) comparing the gain of the amplifier with a prescribed amplifier gain threshold. If the average energy level is greater than the prescribed energy level threshold and if the gain of the amplifier is less than the prescribed amplifier gain threshold then a valid signal is declared and the transmitter of the modem is activated.

27 Claims, 4 Drawing Sheets

METHOD AND APPARATUS FOR ENERGY DETECTION IN A MODEM

FIELD OF THE INVENTION

This invention relates to the field of energy detection for detecting a valid signal in a modem, and more particularly or detecting a valid signal at a receiver of a modem for activation of a transmitter and for enabling power savings in receiver and transmitter circuits in modems.

BACKGROUND OF THE INVENTION

In communication systems a modem is used to convert (modulate) digital signals generated by a computer into analog signals suitable for transmission over telephone lines. Another modem, located at the receiving end of the transmission, converts (demodulates) the analog signals back into digital form. Transmitter and receiver circuits located in a central switching office linecard are generally maintained in a power-on state waiting for communication requests from a user. The central office linecard is also used to store system parameters such as equalizer coefficients or automatic gain control (AGC) settings in the case of a sudden drop of signal power or other interruptions. The linecard must discriminate between a desired received signal and noise or other interference signals based on the level and the occupied frequency range. in addition, on the customer side (CPE-customer premise equipment), the receiver must be able to perform a similar task.

The advantage of maintaining the central office equipment in a power-on state is that it will respond quickly to users'requests. However, this results in a significant waste of power when the receiver is inactive. Traditional simple analog energy or peak detect methods for signal detection are easily triggered by impulse noise or other radio frequency (RF) signals.

Further, in situations where the received signal disappears suddenly due to a power surge or other transmitter failure, prior art systems would start to reconverge their equalizer and timing recovery circuits on a non-QAM (quadrature amplitude modulation) signal, which led to problems when the proper QAM signal reappeared.

Consequently, there is a need for an energy detection system that permits the receiver and transmitter circuits in modems to conserve power when there is no communication requested by a user, and adapted to detect a valid user signal reliably and differentiate it from high level noise or other types of interference.

SUMMARY OF THE INVENTION

An object of the present invention is to provide a method and an apparatus for improving the detection of a valid carrier signal at a receiver of a modem.

Another object of the present invention is to provide a method and an apparatus for enabling power savings in receiver and transmitter circuits in modems.

In accordance with an aspect of the present invention there is provided an energy detection apparatus for detecting a valid signal at a receiver in a modem comprising: (a) an integrator for averaging an energy level in a prescribed number of signal samples to produce an average energy level; and (b) a first comparator for comparing the average energy level with a predetermined threshold, whereby if the average energy level is greater than the predetermined threshold then the valid signal has been detected.

In accordance with another aspect of the present invention there is provided a method of energy detection for detecting a valid signal in a modem, comprising the steps of: (a) processing a prescribed number of signal samples; (b) determining an average energy level for the prescribed number of signal samples; and (c) declaring the valid signal when the average energy level is greater than a prescribed energy level threshold.

In accordance with another aspect of the present invention there is provided a method of energy detection for detecting a valid signal in a receiver of a modem, comprising the steps of: (a) processing a prescribed number of signal samples; (b) determining an average energy level for the prescribed number of signal samples; (c) determining a gain of an amplifier based on the processed signal samples; (d) comparing the average energy level with a prescribed energy level threshold; and (e) comparing the gain of the amplifier with a prescribed amplifier gain threshold, wherein if the average energy level is greater than the prescribed energy level threshold and if the gain of the amplifier is less than the prescribed amplifier gain threshold then the valid signal has been detected.

BRIEF DESCRIPTION OF THE DRAWINGS

The present invention will be described in conjunction with the drawings in which.

DETAILED DESCRIPTION OF EMBODIMENTS OF THE INVENTION

Figure 1A:
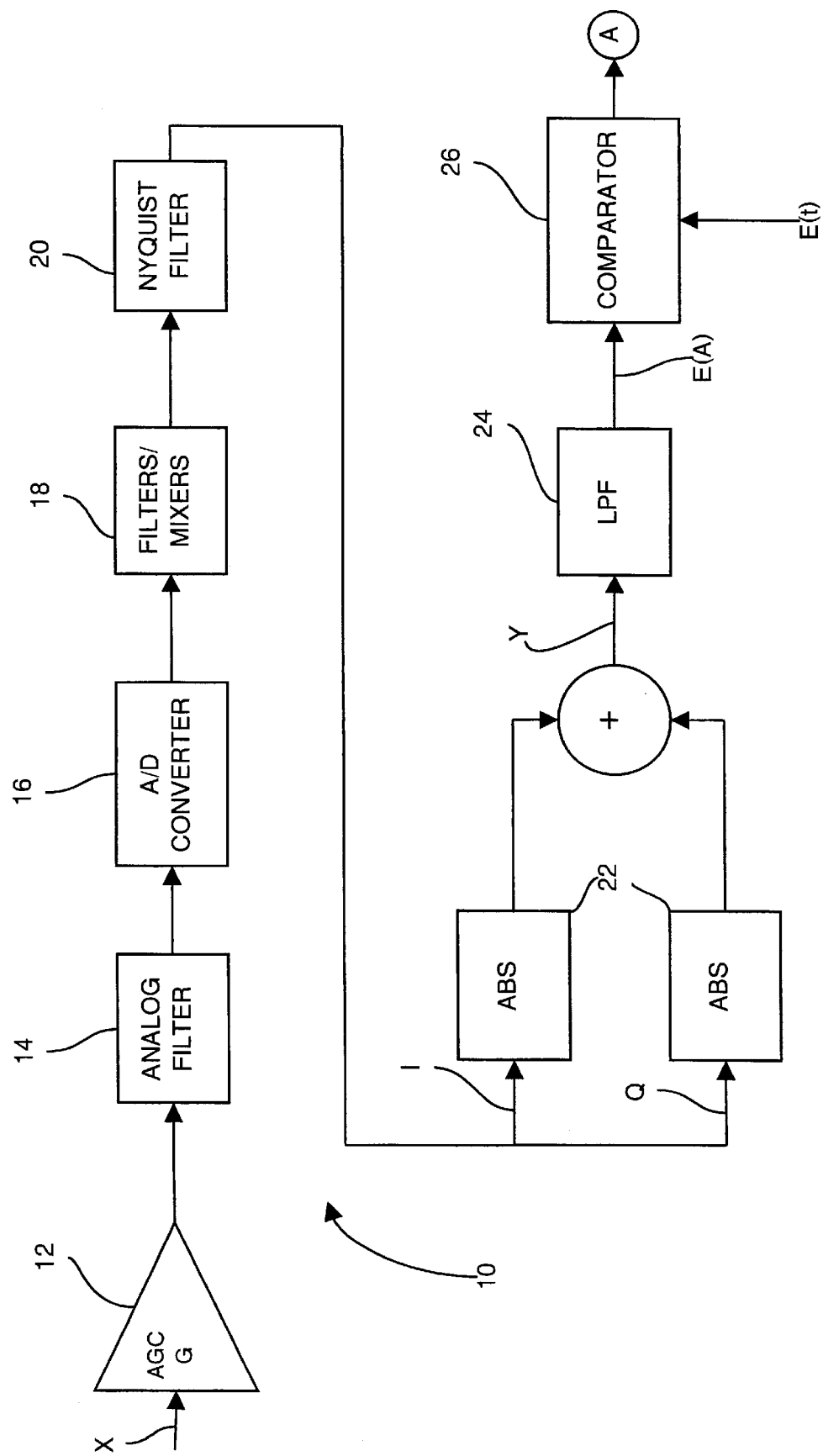
FIGS. 1A and 1B illustrate an energy detection circuit according to the present invention.
Figure 1B:
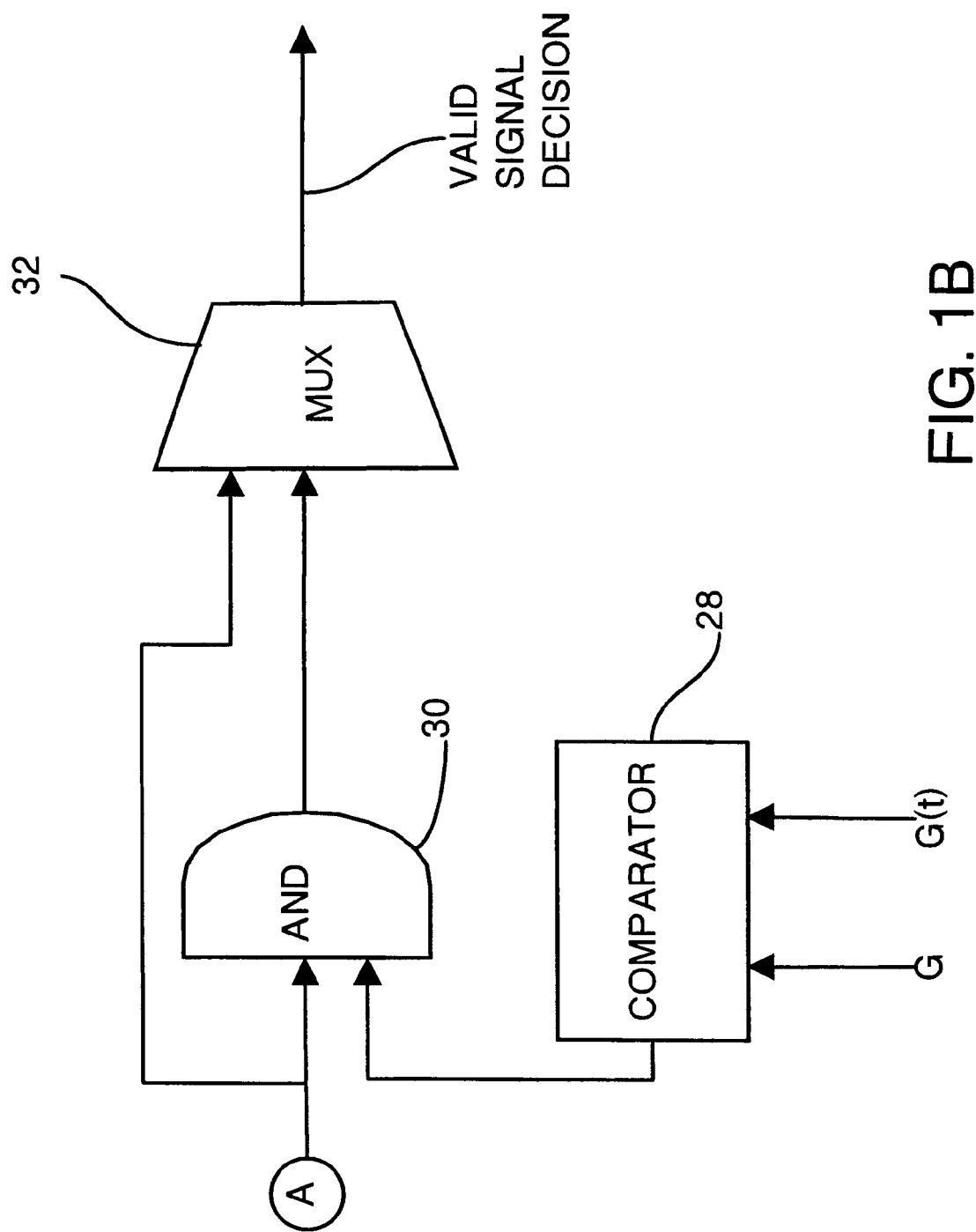

An energy detection circuit 10 is shown in FIGS. 1A and 1B which is used to indicate the presence of a valid carrier signal at a receiver of a modem. The detection of signal energy is useful for many functions including for enabling/disabling power save functions in receivers and transmitters in a central office linecard or CPE.

The energy detection circuit 10 processes an incoming signal X through an automatic gain control (AGC) amplifier 12. The AGC amplifier 12 adjusts the input signal X for attenuation or loss to ensure that the signal X is of a constant strength.

The signal, from the AGC amplifier 12, is processed through an analog filter 14 where the signal is conditioned further to filter out extraneous frequencies. The conditioned signal, from the analog filter 14, is converted into a digital QAM representation (X=I+jQ) by the analog-to-digital (A/D) converter 16. The digital signal is then processed further through a filters/mixers module 18.

The filtering portion of module 18 is used to remove or attenuate the energy of noise and interference of image signals outside the QAM band. The mixing portion of module 18 is used to bring the QAM signal from its modulated transmitted frequency to baseband, as is well known in the art.

The output from the filter/mixers 18 is passed through a Nyquist filter 20 (a digital matched filter) where the composite signal X=I+jQ is divided into the in-phase component (I) and the quadrature component (Q). The I and Q components of the signal are passed through absolute filters 22, and the absolute values of I and Q are summed to form a signal Y. At this stage, the energy detection circuit 10 has already rejected most of the out-of-band interference and noise (by the filters 14, 18, and 20), improving the circuit's 10 discrimination against other non-QAM signals.

The signal Y is averaged by an integrator, such as a low pass filter (LPF) 24, to obtain an average energy level E(A). The average energy level E(A) is obtained by processing a prescribed number of signal samples. A filter pole in the low pass filter 24 provides many design choices including fast energy detection with generally coarse accuracy, or slower energy detection with fine level accuracy.

The number of signal samples to process to obtain a workable E(A) depends on the filter pole and the number of time constants required for the filter 24 to settle. In particular, the filter pole is defined as $1/\tau$, where $\tau=2^k/mr$, where k is a detection accuracy parameter and mr is the modulation rate of the modem. The value of k depends on the modulation rate of the modem, and the degree of accuracy and detection speed required. The typical operating range of k is between 6 and 12, where k=7 for coarse accuracy and k=9 for fine accuracy, for example. The number of signal samples to process is defined as $2^k \times N$, where N is a number of time constants required for the filter 24 to settle.

For example, for a coarse setting, approximately 512 samples is adequate, and for a fine setting approximately 2048 samples would be required. In the above examples, four time constants are required for the filter 24 to settle with $2^k$ samples per time constant (i.e. for coarse setting, k=7, $2^7=128$, 128 samples/time constant×4 time constants=512 samples, and for fine setting, k=9, $2^9=512$, 512 samples/time constant×4 time constants=2,048 samples).

A first comparator 26 determines if a valid signal is present by comparing the average energy level E(A) with a predetermined threshold E(t). A second comparator 28 can also be used to assist in determining if a valid signal is present by comparing the AGC gain G of the AGC amplifier 12 (after processing the prescribed number of signal samples-$2^k \times N$) with a predetermined threshold G(t) (for example, the maximum gain of the amplifier 12).

In particular, as shown in FIG. 1B, the result of the average energy level comparator 26 can pass directly through a multiplexer (MUX) 32 to provide a valid signal decision, or alternatively, the result of the average energy level comparator 26 can be logically processed through an AND operator 30 prior to passing through the MUX 32 to provide the valid signal decision.

Consequently, two types of energy detection are used according to the present invention: (1) considering only average energy, where a valid signal is detected when the average energy level E(A) exceeds the threshold E(t) and (2) considering both average energy and AGC gain, where a valid signal is detected when the average energy level E(A) exceeds the threshold E(t) and AGC gain G is less than the threshold G(t).

Figure 2:
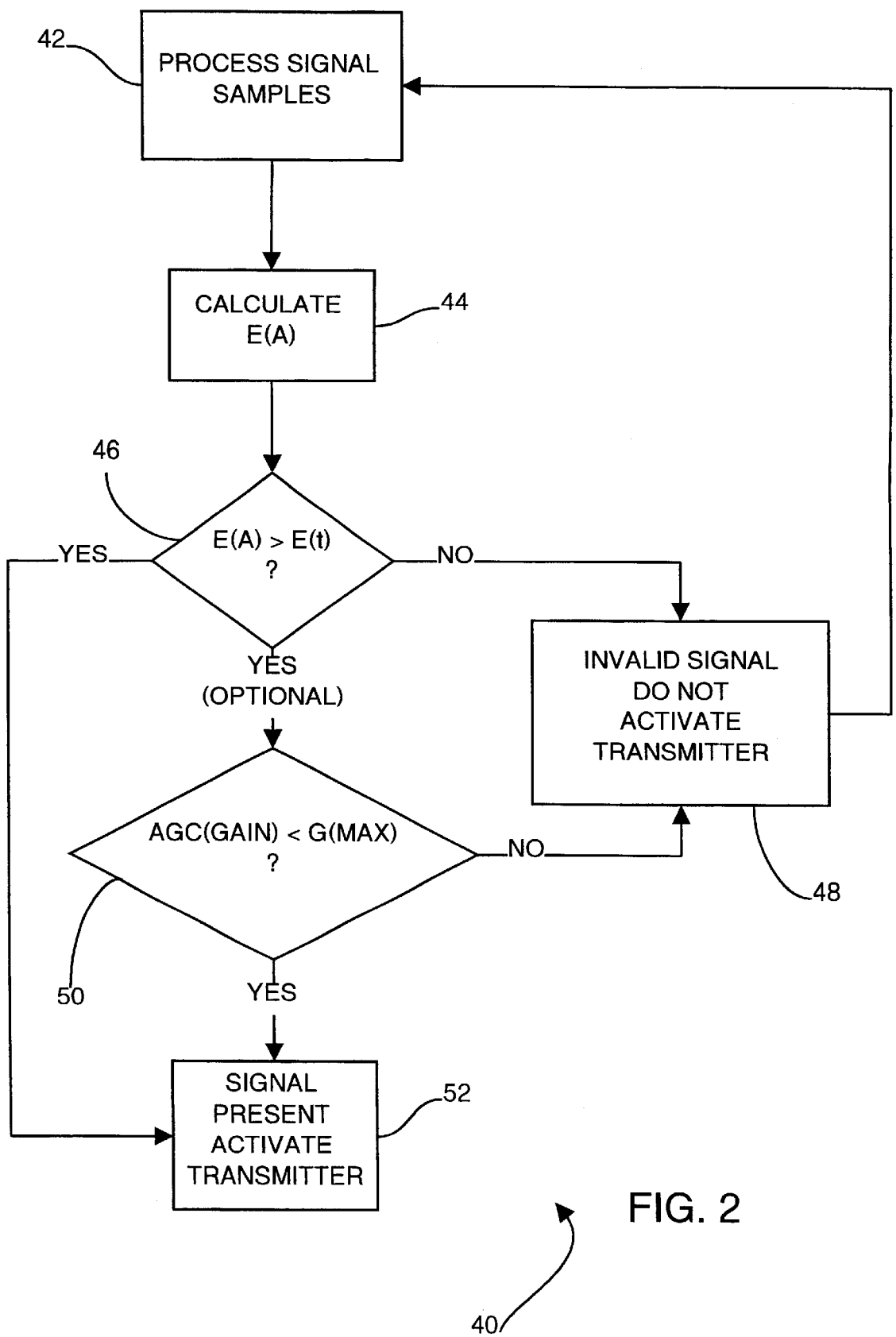
FIG. 2 illustrates a flow chart showing the steps of the method of energy detection according to the present invention.

An energy detection method 40 for the detection of a valid signal at a modem is described with reference to FIGS. 2 and 3A,B.

The prescribed number of signal samples (e.g. 512 to 2048) are processed by the circuit 10 at step 42 as discussed above. An average energy level E(A) is calculated at step 44 by processing the signal Y through the low pass filter 24. The average energy level E(A) is compared to the predetermined threshold energy level E(t) at step 46. The threshold energy level E(t) is a design choice and is selected based on the lowest level valid QAM signal that can occur due to the largest loop attenuation and the lowest transmitted power, as well as on the highest estimated level of noise present at the receiver input. For example, the threshold energy level E(t) can be set to approximately ⅛ of full-scale (full scale=1), but is fully programmable based on operating environment, etc.

Figure 3A:
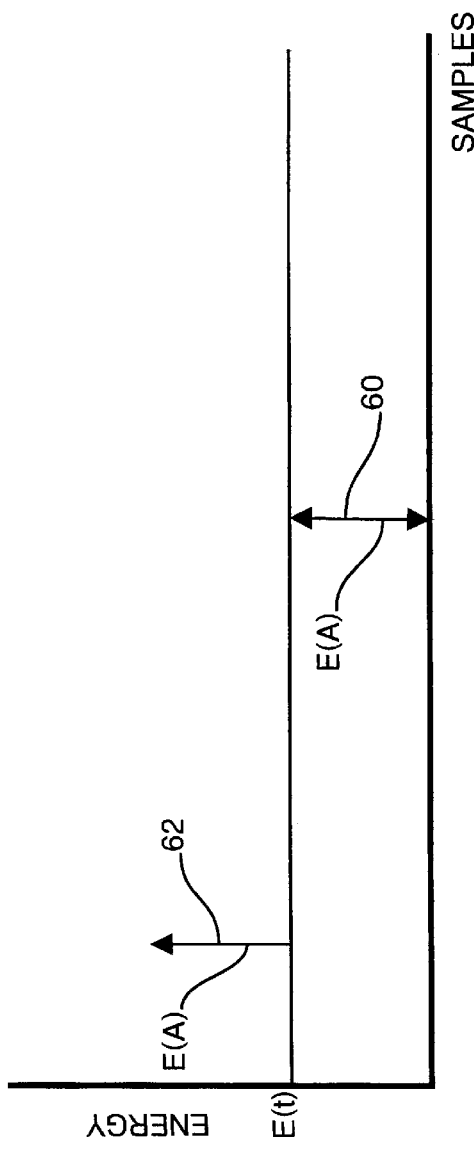
FIG. 3A illustrates a graphical representation of signal energy versus signal samples with a predetermined threshold definition.

An illustrative example of a specific threshold energy level E(t) is shown in the graph of FIG. 3A. If the average energy level E(A) is less than the threshold energy level E(t) as illustrated by a range arrow 60 then signal presence is not declared by the circuit 10 and the transmitter is not activated at step 48. Processing periodically (e.g. every 5 seconds) returns to step 42 to repeat the detection process.

If the average energy level E(A) is greater than the threshold energy level E(t) as illustrated by a range arrow 62, as determined at step 46, then either valid signal presence is declared by the circuit 10 at step 52 or processing continues to step 50 where the gain G of the AGC amplifier 14 is compared to the predetermined amplifier gain threshold G(t), for example a maximum gain G(MAX) for the AGC amplifier 14.

Figure 3B:
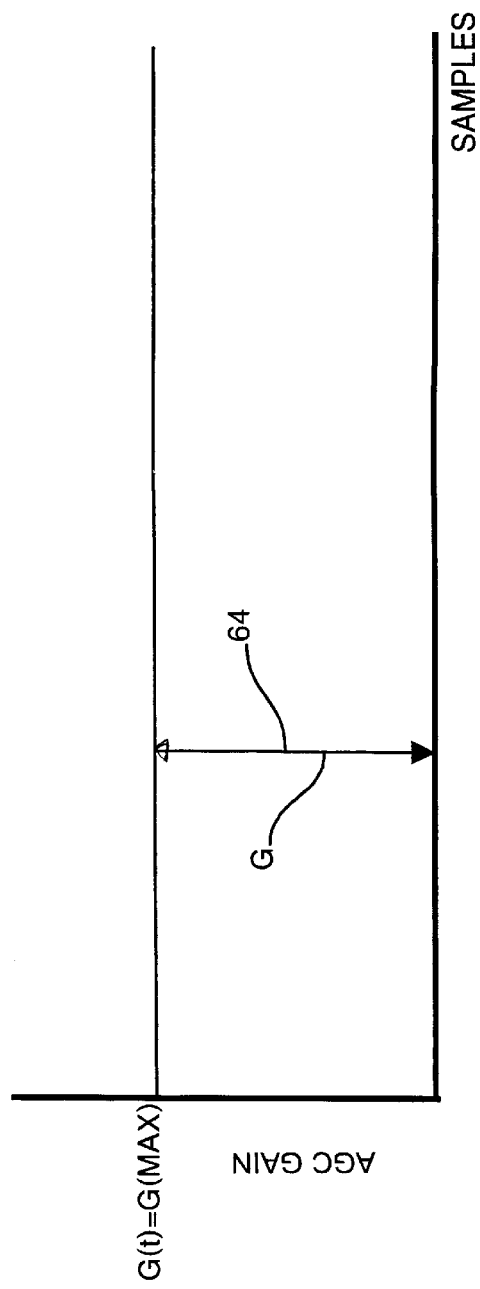
FIG. 3B illustrates a graphical representation of amplifier gain versus signal samples with a predetermined threshold definition.

If the optional AGC threshold comparison is performed at step 50, an illustrative example of a specific amplifier gain threshold (i.e. G(t)=G(MAX)) is shown in the graph of FIG. 3B. If the gain G of the AGC amplifier 14 is equal to G(MAX) then signal presence is not declared by the circuit 10 and the transmitter is not activated at step 48. Processing periodically (e.g. every 5 seconds) returns to step 42 to repeat the detection process.

If the gain G of the AGC amplifier 14 is less than G(MAX) as illustrated by a range arrow 64 then valid signal presence is declared by the circuit 10 and the transmitter is activated at step 52. In particular, at step 52, the circuit 10 advises QAM demodulation firmware in the modem of signal presence so it can initialize the line, activate the transmitter and the like.

The gain G of the analog AGC amplifier 12 is examined, at step 50, since noise can be heavily amplified and appear to be a signal in the receiver. In summary, valid signal presence is declared by the circuit 10 either if (1) calculated average energy E(A) exceeds the energy threshold level E(t) or if (2) in addition to the exceeding the energy threshold E(t) the gain G of the AGC amplifier 12 is less than the amplifier gain threshold G(t).

The energy detection apparatus and method of the present invention permits the transmitter to be powered down completely, and the receiver to be powered down and turned on only periodically to detect energy (e.g. for 100 ms every 5 s). Another use of energy detection on the CPE side is removal of energy (i.e. removed QAM signal) to reset the CPE side, which happens when the CPE detects an energy drop below a threshold, which sets the CPE to its simplest mode (narrowband).

What is claimed is:

1. An energy detection apparatus for detecting a valid incoming signal at a receiver in a modem comprising:

(a) an integrator for averaging an energy level of a signal from which most out-of-band interference and noise has been rejected, the energy level being averaged in a prescribed number of signal samples to produce an average energy level;

(b) a first comparator for comparing the average energy level with a predetermined threshold level is graeter than the predetermined threshold then the valid signal has been detected;

(c) an amplifier having a maximum gain and an amplifier gain in response to the incoming signal; and (d) a second comparator for comparing the amplifier gain with a predetermined amplifier gain threshold, whereby if the average energy level is greater than a predetermined threshold, and if the amplifier gain is less then the predetermined amplifier gain threshold, then the valid signal has been detected.

2. The apparatus of claim 1, wherein the predetermined amplifier gain threshold is equal to the maximum gain of the amplifier.

3. The apparatus of claim 1, further including a digital matched filter for separating a digital representation of the signal samples into an in-phase component and a quadrature component.

4. The apparatus of claim 3, wherein the digital matched filter is a Nyquist filter.

5. The apparatus of claim 4, further including an adder for adding an absolute value of the in-phase component with an absolute value of the quadrature component.

6. The apparatus of claim 1, wherein the amplifier is an automatic gain control amplifier for conditioning the signal samples for loss and attenuation to ensure an output signal from the amplifier is of a constant strength.

7. The apparatus of claim 1, wherein the integratear includes a low pass filter having a filter pole.

8. The apparatus of claim 7, wherein the filter pole is defined as $1/\pi$, where $\pi=2^k$ divided by a modulation rate of the modem and k presents a detection accuracy parameter, wherein the prescribed number of signal samples is equal to $2^k \times N$, where N is a number of time constants required for the low pass filter to settle.

9. The apparatus of claim 8, wherein k depends on the modulation rate of the modem, signal detection accuracy, and signal detection speed.

10. The apparatus of claim 9, wherein k is between 6 and 12.

11. The apparatus of claim 10, wherein N is equal to 4 and k is equal to 7, whereby the prescribed number of signal samples is equal to 512.

12. The apparatus of claim 10, wherein N is equal to 4 and k is equal to 9, whereby the prescribed number of signal samples is equal to 2048.

13. A method of energy detection for detecting a valid incoming signal in a modem, comprising the steps of:

(a) processing a prescribed number of signal samples of a signal from which most out-of-band interference and noise has been rejected;

(b) determining an average energy level for the prescribed number of signal samples;

(c) determining a gain of an amplifier based on the incoming signal; and (d) declaring the valid signal when the average energy level is greater than a prescribed energy level threshold and when the gain of the amplifier is less than a prescribed amplifier gain threshold.

14. The method of claim 13, further including separating a digital representation of the signal samples into an in-phase component and a quadrature component.

15. The method of claim 14, wherein step (b) includes the following steps:

adding an absolute value of the in-phase component of the signal samples to an absolute value of the quadrature component of the signal samples to obtain a sum of signal sample components; and integrating the sum of signal sample components for the prescribed number of signal samples.

16. The method of claim 13, wherein the predetermined amplifier gain threshold is equal to a maximum gain of the amplifier.

17. The method of claim 13, wherein the prescribed number of signal samples is equal to $2^k \times N$, where N represents a time constant and k represents a detection accuracy parameter.

18. The method of claim 17, wherein k is between 6 and 12.

19. The method of claim 18, wherein N is equal to 4 and k is equal to 7, whereby the prescribed number of signal samples is equal to 512.

20. The method of claim 18, wherein N is equal to 4 and k is equal to 9, whereby the prescribed number of signal samples is equal to 2048.

21. A method of energy detection for detecting a valid incoming signal in a receiver of a modem, comprising steps of:

(a) processing $2^k \times N$ signal samples, where N represents a time constant and k represents a detection accuracy parameter;

(b) determining an average energy level for the signal samples:

(c) determining a gain of an amplifier based on the incoming signal;

(d) coming the average energy level with a prescribed energy level threshold; and (e) comparing the gain of the amplifier with a prescribed amplifier gain threshold, wherein if the average energy level is greater than the prescribed energy level threshold and if the gain of the amplifier is less than the prescribed amplifier gain threshold, detection of the valid signal is declared.

22. The method of claim 21, further including a step of separating a digital representation of the signal samples into an in-phase component and a quadrature component.

23. The method of claim 22, wherein step (b) includes the following steps:

adding an absolute value of the in-phase component of the signal samples to an absolute value of the quadrature component of the signal samples to obtain a sum of signal sample components; and integrating the sum of signal sample components for the prescribed number of signal samples.

24. The method of claim 22, wherein the predetermined amplifier gain threshold is equal to a maximum gain of the amplifier.

25. The method of claim 21, wherein k is between 6 and 12.

26. The method of claim 25, wherein N is equal to 4 and k is equal to 7, and a number of signal samples is equal to 512.

27. The method of claim 25, wherein N is equal to 4 and k is equal to 9, and a number of signal samples is equal to 2048.

* * * * *